(12) United States Patent
Nakano et al.

(10) Patent No.: US 11,035,404 B2
(45) Date of Patent: Jun. 15, 2021

(54) BEARING DEVICE AND ROTARY MACHINE

(71) Applicant: Mitsubishi Hitachi Power Systems, Ltd., Yokohama (JP)

(72) Inventors: Takashi Nakano, Yokohama (JP); Tanehiro Shinohara, Tokyo (JP); Takaaki Kaikogi, Tokyo (JP); Yuichiro Waki, Yokohama (JP); Yutaka Ozawa, Takasago (JP)

(73) Assignee: MITSUBISHI POWER, LTD., Yokohama (JP)

( * ) Notice: Subject to any disclaimer, the term of this patent is extended or adjusted under 35 U.S.C. 154(b) by 219 days.

(21) Appl. No.: 16/088,236

(22) PCT Filed: Aug. 10, 2016

(86) PCT No.: PCT/JP2016/073665
§ 371 (c)(1),
(2) Date: Sep. 25, 2018

(87) PCT Pub. No.: WO2018/029834
PCT Pub. Date: Feb. 15, 2018

(65) Prior Publication Data
US 2020/0408257 A1 Dec. 31, 2020

(51) Int. Cl.
*F16C 17/03* (2006.01)
*F16C 33/10* (2006.01)

(52) U.S. Cl.
CPC ............ *F16C 17/03* (2013.01); *F16C 33/108* (2013.01); *F16C 33/1085* (2013.01); *F16C 2360/23* (2013.01); *F16C 2380/26* (2013.01)

(58) Field of Classification Search
CPC ........ F16C 17/02; F16C 17/03; F16C 17/035; F16C 33/106; F16C 33/108; F16C 33/1085
See application file for complete search history.

(56) References Cited

U.S. PATENT DOCUMENTS 5,738,447 A 4/1998 Nicholas
5,795,076 A 8/1998 Ball et al.
(Continued)

FOREIGN PATENT DOCUMENTS

CN 103206452 A 7/2013
CN 103348148 A 10/2013
(Continued)

OTHER PUBLICATIONS

Examination report dated Jan. 28, 2020, issued in counterpart IN Application No. 201817035189, with English translation (6 pages).
(Continued)

*Primary Examiner* — James Pilkington
(74) *Attorney, Agent, or Firm* — Westerman, Hattori, Daniels & Adrian, LLP

(57) ABSTRACT

A bearing device includes a carrier ring, a first bearing portion disposed along an outer periphery of a rotor shaft on a radially inner side of the carrier ring; a second bearing portion disposed along the outer periphery and downstream of the first bearing portion, with respect to a rotational direction of the rotor shaft, on the radially inner side of the carrier ring; a pair of side plates disposed along the outer periphery of the rotor shaft, on both sides of the carrier ring with respect to an axial direction; a first oil guide portion disposed downstream of the first bearing portion and upstream of the second bearing portion, and configured to change a flow direction of oil after passing through a gap between an inner peripheral surface of the first bearing portion and an outer peripheral surface of the rotor shaft to guide the oil.

16 Claims, 8 Drawing Sheets

(56) References Cited

U.S. PATENT DOCUMENTS

| | | | |
|---|---|---|---|
| 8,834,032 B2 | 9/2014 | Suzuki et al. | |
| 9,746,024 B2 * | 8/2017 | Sato | F16C 17/03 |
| 10,514,058 B2 * | 12/2019 | Nakano | F16C 33/10 |
| 2002/0141670 A1 | 10/2002 | Nicholas | |
| 2010/0220944 A1 | 9/2010 | Waki et al. | |
| 2015/0354628 A1 | 12/2015 | Hemmi et al. | |

FOREIGN PATENT DOCUMENTS

| | | |
|---|---|---|
| CN | 104114883 A | 10/2014 |
| CN | 204900519 U | 12/2015 |
| CN | 105351359 A | 2/2016 |
| JP | 2000-213542 A | 8/2000 |
| JP | 2006-234147 A | 9/2006 |
| JP | 2010-203481 A | 9/2010 |
| JP | 2012-117608 A | 6/2012 |
| JP | 2012-172729 A | 9/2012 |
| JP | 2016011698 A | 1/2016 |
| JP | 2016-145587 A | 8/2016 |
| JP | 2016142311 A | 8/2016 |
| WO | 2010/097990 A1 | 9/2010 |
| WO | 2014/103004 A1 | 7/2014 |

OTHER PUBLICATIONS

Office Action dated Sep. 19, 2019, issued in counterpart KR application No. 10-2018-7027137, with English translation. (10 pages).

Office Action dated Jun. 26, 2019, issued in counterpart CN Application No. 201680084045.9, with English translation (11 pages).

Notification of Transmittal of Translation of the International Preliminary Report on Patentability (Form PCT/IB/326) issued in counterpart International Application No. PCT/JP2016/073665 dated Feb. 21, 2019 with Forms PCT/IB/373, PCT/IB/338 and PCT/ISA/237, with English translation. (17 pages).

International Search Report dated Nov. 15, 2016, issued in counterpart application No. PCT/JP2016/073665, with English translation. (12 pages).

* cited by examiner

AXIAL DIRECTION

ROTATIONAL DIRECTION S

ROTATIONAL DIRECTION S

BEARING DEVICE AND ROTARY MACHINE

This application is a 371 of International Application No. PCT/JP2016/073665 filed on Aug. 10, 2016, the entire contents of which are incorporated herein by reference.

TECHNICAL FIELD

The present disclosure relates to a bearing device for rotatably supporting a rotational shaft, and a rotary machine.

BACKGROUND ART

Generally, a rotary machine such as a steam turbine and a gas turbine includes a bearing device for rotatably supporting a rotor shaft (rotational shaft). Normally, lubricant oil is interposed between an outer peripheral surface of the rotor shaft and a bearing surface of a bearing portion supporting the rotor shaft, to ensure a lubricating property therebetween.

For instance, Patent Document 1 discloses a tilting-pad bearing configured to support a rotor shaft with a plurality of bearing pads arranged in the circumferential direction of the rotational shaft. In this tilting-pad bearing, lubricant oil is supplied from a plurality of oil-supply nozzles disposed upstream and downstream of the bearing pads, to the gap between the outer peripheral surface of the rotor shaft and the bearing surfaces of the bearing pads. Furthermore, side plates are disposed on both end surfaces of the lower half part of the carrier ring, so as to suppress leakage of lubricant oil supplied from the oil-supply nozzles to the outside.

CITATION LIST

Patent Literature

Patent Document 1: WO2010/097990A
Patent Document 2: JP2006-234147A

SUMMARY

Problems to be Solved

However, in the tilting-pad bearing disclosed in Patent Document 1, the oil flowing from the upstream side toward the downstream side between the bearing surfaces of the bearing pads and the outer peripheral surface of the rotor shaft in accordance with rotation of the rotor shaft is heated by friction with the bearing surfaces of the bearing pads or the outer peripheral surface of the rotor shaft. Thus, oil with an increased temperature flows through downstream bearing pads, where more friction heat is accumulated, and thus the temperature increases considerably. An excessive temperature increase of a bearing pad may be one of the causes of malfunction of the bearing device. Thus, it is necessary to develop a technique to suppress a temperature increase of bearing pads.

In this regard, Patent Document 1 does not disclose any specific measure for suppressing temperature increase of the bearing pads.

In view of the above, an object of at least one embodiment of the present invention is to provide a bearing device whereby it is possible to suppress temperature increase of a bearing portion effectively, and a rotary machine.

Solution to the Problems (1) A bearing device according to at least one embodiment of the present invention includes: a carrier ring; a first bearing portion disposed along an outer periphery of a rotor shaft on a radially inner side of the carrier ring; a second bearing portion disposed along the outer periphery of the rotor shaft and downstream of the first bearing portion, with respect to a rotational direction of the rotor shaft, on the radially inner side of the carrier ring; a pair of side plates disposed along the outer periphery of the rotor shaft, on both sides of the carrier ring with respect to an axial direction; a first oil guide portion disposed downstream of the first bearing portion and upstream of the second bearing portion, and configured to change a flow direction of oil after passing through a gap between an inner peripheral surface of the first bearing portion and an outer peripheral surface of the rotor shaft to guide the oil; and an oil discharge port portion disposed on the carrier ring or each of the side plates and configured to discharge the oil guided by the first oil guide portion to outside.

With the above configuration (1), the first oil-guide portion disposed on the downstream side of the first bearing portion and the upstream side of the second bearing portion changes the flow direction of oil that has passed through the gap between the inner peripheral surface of the first bearing portion and the outer peripheral surface of the rotor shaft and thus has an increased temperature, and guides the oil. Further, the high-temperature oil guided by the first oil guide portion is discharged outside through the oil discharge port portions disposed on the respective side plates or the carrier ring. Accordingly, at least a part of oil having an increased temperature from passing through the gap between the first bearing portion and the rotor shaft is discharged outside, without flowing into the gap between the second bearing portion and the rotor shaft. Thus, it is possible to suppress temperature increase of the second bearing portion effectively.

(2) In an embodiment, in the above configuration (1), the first oil guide portion includes a scraper disposed downstream of the first bearing portion, and, of an upstream end surface of the scraper, both end regions with respect to the axial direction are inclined from the axial direction so as to be offset downstream in the rotational direction of the rotor shaft with axial distance from a center part of a width of the first bearing portion with respect to the axial direction.

With the above configuration (2), the high-temperature oil flowing between the inner peripheral surface of the first bearing portion and the outer peripheral surface of the rotor shaft in the circumferential direction of the rotor shaft has its flow direction changed by the scraper, and is guided to both sides with respect to the axial direction along the inclined surfaces of the scraper. Thus, it is possible to avoid inflow of high-temperature oil to the second bearing portion, and to suppress temperature increase of the second bearing portion effectively.

(3) In another embodiment, in the above configuration (1), the first oil guide portion includes an oil recovery box disposed downstream of the first bearing portion. The oil recovery box includes: an oil inlet portion disposed on an upper surface of the oil recovery box, the oil inlet portion having an opening into the gap between the inner peripheral surface of the first bearing portion and the outer peripheral surface of the rotor shaft; an inner flow passage portion disposed so as to extend in the axial direction inside the oil recovery box, the inner flow passage portion being in communication with the oil inlet portion; and an oil outlet portion disposed on a side surface or a bottom surface of the oil recovery box, for bringing the inner flow passage portion and the oil discharge port portion into communication.

With the above configuration (3), the high-temperature oil flowing between the inner peripheral surface of the first bearing portion and the outer peripheral surface of the rotor shaft in the circumferential direction of the rotor shaft is introduced into the oil recovery box from the oil inlet portion, passes through the inner flow passage portion, and is discharged from the oil discharge port portion via the oil outlet portion disposed on the side surface or the bottom surface of the oil recovery box. Thus, it is possible to avoid inflow of high-temperature oil to the second bearing portion, and to suppress temperature increase of the second bearing portion effectively.

(4) In some embodiments, in any one of the above configurations (1) to (3), the oil discharge port portion includes an opening portion formed on each of the side plates and disposed downstream of the first bearing portion and upstream of the second bearing portion.

With the above configuration (4), it is possible to smoothly discharge high-temperature oil that flows between the inner peripheral surface of the first bearing portion and the outer peripheral surface of the rotor shaft in the circumferential direction of the rotor shaft, via the opening portion formed on each of the side plates, before the oil flows into the gap between the inner peripheral surface of the second bearing portion and the outer peripheral surface of the rotor shaft.

(5) In some embodiments, in any one of the above configurations (1) to (4), the oil discharge port portion includes an aperture portion disposed on the carrier ring, downstream of the first bearing portion and upstream of the second bearing portion.

With the above configuration (5), it is possible to smoothly discharge high-temperature oil that flows between the inner peripheral surface of the first bearing portion and the outer peripheral surface of the rotor shaft in the circumferential direction of the rotor shaft, via the aperture portion formed on the carrier ring before the oil flows into the gap between the inner peripheral surface of the second bearing portion and the outer peripheral surface of the rotor shaft.

(6) In some embodiments, in any one of the above configurations (1) to (5), in a carrier-ring side region of the inner peripheral surface of each of the side plates, a groove extending in a circumferential direction along a side surface of the first bearing portion is formed at least in a part of an extending range of the first bearing portion. The bearing device further includes a second oil guide portion configured to guide the oil after flowing into the groove from a gap between an inner peripheral surface of the first bearing portion and the outer peripheral surface of the rotor shaft, and return the oil to a gap between a downstream end portion of the first bearing portion and an upstream end portion of the second bearing portion.

With the above configuration (6), oil having a relatively low temperature flowing through the groove that extends in the circumferential direction along the side surface of the first bearing portion is returned by the second oil guide portion to the gap between the downstream end portion of the first bearing portion and the upstream end portion of the second bearing portion. Thus, it is possible to supply the relatively low-temperature oil to the gap between the inner peripheral surface of the second bearing portion and the outer peripheral surface of the rotor shaft, and to effectively suppress temperature increase of the second bearing portion. Further, in the above configuration (1), it is possible to reduce the amount of oil supplied from outside, by returning the relatively low-temperature oil through the second oil guide portion, instead of the oil discharged outside from the oil discharge port portion after flowing through the gap between the inner peripheral surface of the first bearing portion and the outer peripheral surface of the rotor shaft.

(7) In an embodiment, in the above configuration (6), the first oil guide portion and the second oil guide portion are formed by two flow passages passing through different positions in a radial direction of the carrier ring and intersecting with each other.

As described above, the first oil guide portion is configured to change the flow direction of oil having passed through the gap between the inner peripheral surface of the first bearing portion and the outer peripheral surface of the rotor shaft, and discharge the oil outside. Furthermore, the second oil guide portion is configured to return the oil flowing through the groove formed along the side surface of the first bearing portion to the gap between the first bearing portion and the second bearing portion. That is, the first oil guide portion and the second oil guide portion change the oil of the main flow flowing downstream in the rotational direction of the rotor shaft along the outer peripheral surface of the rotor shaft, from the relatively high-temperature oil after passing through the gap between the inner peripheral surface of the first bearing portion and the outer peripheral surface of the rotor shaft, to the relatively low-temperature oil flowing through the groove formed along the side surface of the first bearing portion.

In this regard, with the first oil guide portion and the second oil guide portion formed by two flow passages that intersect with each other as in the above (7), it is possible to change the main flow oil smoothly.

(8) In some embodiments, in the above configuration (6) or (7), the second oil guide portion includes a flow guide wall disposed on each of the side plates so as to protrude toward the carrier ring, inside the groove, and the flow guide wall is inclined from a direction orthogonal to the axial direction of the rotor shaft, so as to become closer to the carrier ring toward the downstream side with respect to the rotational direction of the rotor shaft.

With the above configuration (8), the second oil guide portion includes the flow guide wall disposed on each of the side plates so as to protrude toward the carrier ring in the groove, and thus it is possible to change the flow direction of oil flowing through the groove toward the center side with respect to the width direction of the second bearing portion, with the flow guide wall. Furthermore, the flow guide wall is inclined from a direction orthogonal to the axial direction of the rotor shaft so as to become closer to the carrier ring toward the downstream side of the rotational direction of the rotor shaft, and thus it is possible to change the flow direction smoothly without impairing the flow of oil inside the groove.

(9) In some embodiments, in any one of the above configurations (6) to (8), the second oil guide portion includes an inner flow passage disposed inside the side plates so as to bring into communication an oil inlet aperture and an oil outlet aperture each of which has an opening into the groove. The oil inlet aperture is disposed so as to be positioned by the side of the first bearing portion. The oil outlet aperture is disposed on a circumferential-directional position between the downstream end portion of the first bearing portion and the upstream end portion of the second bearing portion.

With the above configuration (9), it is possible to guide the oil flowing through the groove from the side of the first bearing portion to the upstream end portion of the second bearing portion with the second oil guide portion, via the inner flow passage of the side plates, without impairing the flow of the relatively high-temperature oil guided by first oil guide portion and discharged from the oil discharge port portion.

(10) In some embodiments, in any one of the above configurations (6) to (9), the groove extends along the outer periphery of the rotor shaft, in a circumferential-directional range including an extending range of the first bearing portion and the second bearing portion.

With the above configuration (10), it is possible to guide oil with a relatively low temperature that leaks sideways from the first bearing portion downstream toward the upstream end portion of the second bearing portion, via the groove disposed on the side plates in the circumferential-directional range including extending range of the first bearing portion and the second bearing portion.

(11) In some embodiments, in any one of the above configurations (6) to (10), provided that W is an entire width of each of the side plates in the axial direction and $W_g$ is an axial directional width of the groove, an expression $0.15W \leq W_g$ is satisfied.

In this way, it is possible to ensure a sufficient flow-passage cross sectional area for the groove, and to effectively guide oil with a relatively low temperature leaking sideways from the gap between the inner peripheral surface of the first bearing portion and the outer peripheral surface of the rotor shaft downstream toward the second oil guide portion.

(12) In some embodiments, in any one of the above configurations (6) to (11), the bearing device further includes a fin which is disposed on an inner peripheral surface of each of the side plates and which extends along the outer periphery of the rotor shaft on both sides across the downstream end portion of the first bearing portion with respect to the rotational direction of the rotor shaft. The groove is formed by a recess portion defined by the fin and the inner peripheral surface of each of the side plates which is closer to the carrier ring than the fin.

With the above configuration (12), by providing the fin on the inner peripheral surface of the side plate along the outer periphery of the rotor shaft, it is possible to form the groove (recess portion) with a simple configuration. Furthermore, since a portion other than the fin, of the outer peripheral surface of the side plate, functions as the groove, it is possible to ensure a sufficient flow-passage cross sectional area for the groove to guide relatively-low temperature oil leaking sideways from the gap between the inner peripheral surface of the first bearing portion and the outer peripheral surface of the rotor shaft.

(13) In some embodiments, in any one of the above configurations (6) to (12), a gap between the inner peripheral surface of each of the side plates and the outer peripheral surface of the rotor shaft is narrower in a circumferential directional region of at least a part of an extending range of the first bearing portion than in at least a part of a circumferential directional range upstream of an upstream end portion of the first bearing portion and downstream of a downstream end portion of the second bearing portion.

As described above in the above (6), a groove for guiding relatively-low temperature oil leaking sideways from the gap between the inner peripheral surface of the first bearing portion and the outer peripheral surface of the rotor shaft is disposed on the side plate, in at least a part of the extending range of the first bearing portion. Thus, as in the above (13), with the gap between the inner peripheral surface of the side plate and the outer peripheral surface of the rotor shaft in the circumferential-directional region of at least a part of an extending range of the first bearing portion being relatively small, it is possible to suppress discharge of relatively-low temperature oil in the groove to outside via the gap. Accordingly, it is possible to ensure a sufficient flow rate of relatively-low temperature oil (oil flowing through the groove) introduced toward the second bearing portion by the oil guide portion.

(14) In some embodiments, in any one of the above configurations (6) to (13), a bottom surface of the groove is positioned on an inner side of an outer peripheral surface of the first bearing portion, with respect to a radial direction of the carrier ring.

With the above configuration (14), the groove is disposed on the inner side of the outer peripheral surface of the first bearing portion with respect to the radial direction of the carrier ring, and thus it is possible to receive relatively low-temperature oil leaking sideways from the first bearing portion to the space surrounded by the bottom surface of the groove of the side plate and the side surface of the first bearing portion.

(15) In some embodiments, in any one of the above configurations (1) to (14), the bearing device further includes a semi-circular bearing portion disposed on a radially inner side of an upper half region of the carrier ring and configured to restrain backlash of the rotor shaft from above. The first bearing portion and the second bearing portion are a pair of respective bearing pads disposed on a radially inner side of a lower half region of the carrier ring and configured to support the rotor shaft from below.

With the above configuration (15), the semi-circular bearing portion is disposed on the radially inner side of the upper half region of the carrier ring, and thereby it is possible to restrict backlash of the rotor shaft with the semi-circular bearing portion, and to prevent breakage or the like of a component of the rotary machine due to backlash of the rotor shaft. Furthermore, the first bearing portion and the second bearing portion (a pair of bearing pads) are disposed in the lower half region of the carrier ring, and thus it is possible to support the rotor shaft appropriately with the pair of bearing pads.

(16) A rotary machine according to at least one embodiment of the present invention includes: the bearing device according to any one of the above (1) to (15); and a rotational shaft supported by the bearing device.

With the above rotary machine (16), it is possible to suppress temperature increase of the second bearing portion of the bearing device, and thus it is possible to operate the rotary machine smoothly.

Advantageous Effects

According to at least one embodiment of the present invention, oil having an increased temperature from passing through the gap between the inner peripheral surface of the first bearing portion and the outer peripheral surface of the rotor shaft is discharged outside, and thus it is possible to effectively suppress temperature increase of the second bearing portion.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

In the present specification, the expression "upper half" in terms like "upper half section" and "upper half region" refers to an upper portion in the vertical direction (gravity direction). Similarly, in the present specification, the expression "lower half" in terms like "lower half section" and "lower half region" refers to a lower portion in the vertical direction (gravity direction).

First, with reference to FIGS. 1 and 2, the overall common configuration of a bearing device 10 according to some embodiments will be described.

Figure 1:
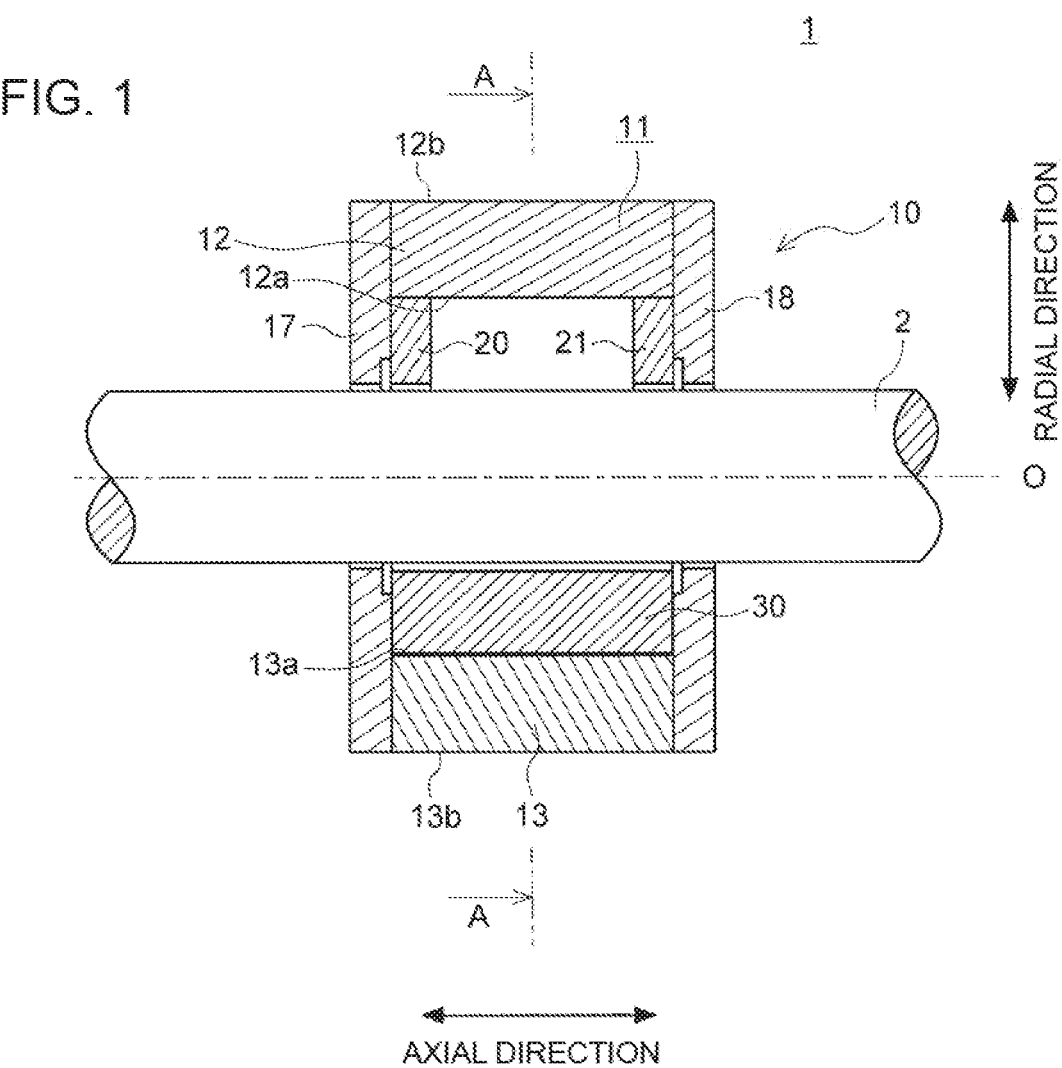
FIG. 1 is a cross-sectional view of a bearing device according to an embodiment, taken along its axial direction.

FIG. 1 is a cross-sectional view of a bearing device 10 according to an embodiment, taken along its axial direction. FIG. 2 is a cross-sectional view taken along line A-A in FIG. 1. FIG. 2 is a cross section taken in a direction orthogonal to the axial direction. In the present embodiment, "axial direction" refers to the direction of the center axis O of the rotor shaft 2 supported by the bearing device 10, and "radial direction" refers to the direction of the radius of the rotor shaft 2, and "circumferential direction" refers to the circumferential direction of the rotor shaft 2.

Figure 2:
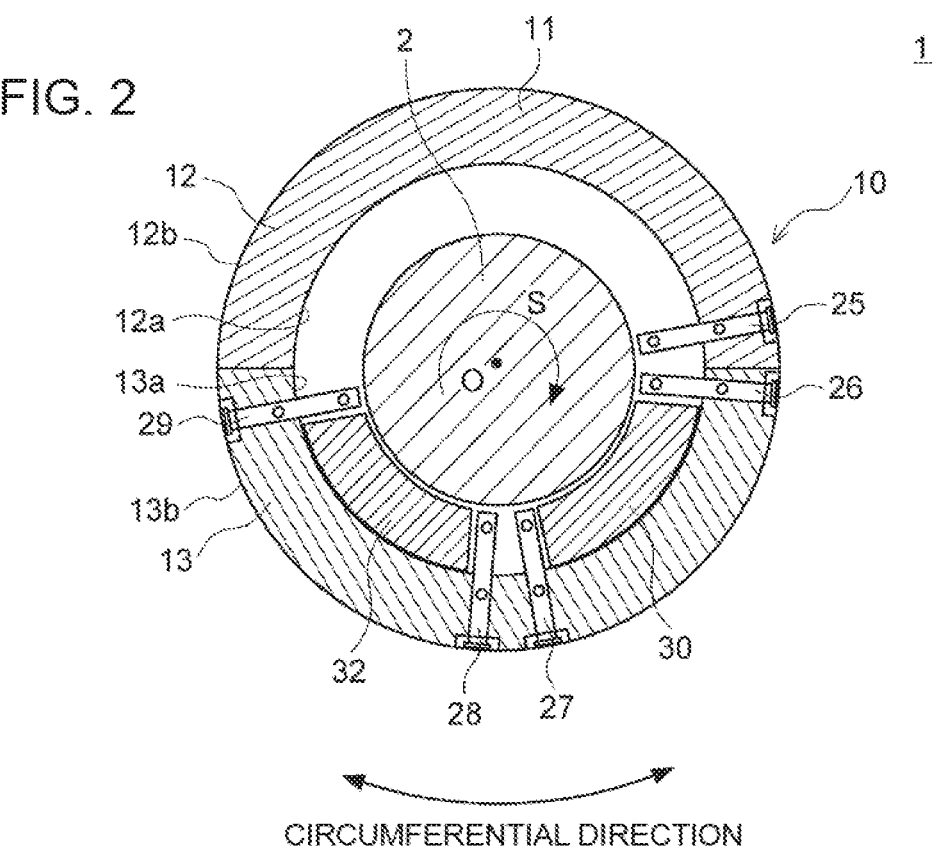
FIG. 2 is a cross-sectional view taken along line A-A in FIG. 1.

The bearing device 10 shown in FIGS. 1 and 2 is a tilting-pad bearing (journal bearing) that uses the direct lubrication method as a lubrication method (oil supply method), and includes a first bearing portion (first bearing pad 30) and a second bearing portion (second bearing pad 32) disposed in the lower half region. Hereinafter, the bearing device 10 shown in the drawings will be described as an example. Nevertheless, the bearing device 10 according to the present embodiment is not limited to this configuration. For instance, in another embodiment, the bearing device 10 may be a thrust bearing, or may use another lubricant method such as oil bath lubrication. Furthermore, in another embodiment, another two bearing pads may be disposed in the upper half region, such that four bearing pads are mounted in the circumferential direction in total. Alternatively, three or more bearing pads may be disposed in the lower half region.

The bearing device 10 according to the present embodiment may be applied to a rotary machine 1, that is, for instance, a turbine such as a gas turbine, a steam turbine (a steam turbine of a nuclear power plant), and a machine-driving turbine, a wind power machine such as a wind turbine generator, or a supercharger.

The rotary machine 1 includes a rotor shaft 2 to be rotary driven, a bearing housing (not shown) accommodating the rotor shaft 2, and the bearing device 10 for supporting the rotor shaft 2.

In an embodiment, the bearing device 10 includes a carrier ring 11 mounted to the bearing housing (not shown) of the rotary machine 1, and a first bearing pad 30 and a second bearing pad 32 disposed radially inside the carrier ring 11.

Furthermore, the bearing device 10 further includes the first oil guide portion 40, 50 and an oil discharge port portion 42, 52 (see FIGS. 3 to 7) as features for suppressing temperature increase of the second bearing pad 32. The configuration including the first oil guide portion 40, 50 and the oil discharge port portion 42, 52 will be described later.

Hereinafter, the specific configuration example of each component in the bearing device 10 will be described specifically.

The carrier ring 11 includes an upper half section carrier ring 12 and a lower half section carrier ring 13. The upper half section carrier ring 12 and the lower half section carrier ring 13 include inner peripheral surfaces 12a, 13a and outer peripheral surfaces 12b, 13b, respectively, each of which has a semi-circular cross section in a direction perpendicular to the axial direction. In the example shown in the drawings, the carrier ring 11 is divided into the upper half section carrier ring 12 and the lower half section carrier ring 13. Nevertheless, the carrier ring 11 may have an integrated structure.

On both end sides of the carrier ring 11 with respect to the axial direction, a pair of side plates 17, 18 are disposed along the outer periphery of the rotor shaft 2. The side plates 17, 18 are formed to have a disc shape, and have a hole formed in the center, through which the rotor shaft 2 is inserted. These side plates 17, 18 suppress outward leakage of lubricant oil supplied from the oil-supply nozzles 25 to 28 described below, to a suitable extent.

The upper half section carrier ring 12 includes guide metals (semi-circular bearing portions) 20, 21 mounted to the inner peripheral surface 12a, mainly to suppress backlash of the rotor shaft 2 from above. For instance, a pair of guide metals 20, 21 are mounted on both end sides, with respect to the axial direction, of the upper half section carrier ring 12, and on the inner side, with respect to the axial direction, of the side plates 17, 18. The guide metals 20, 21 are formed to have a semi-circular shape.

As described above, the guide metals 20, 21 are disposed on the radially inner side of the upper half section carrier ring 12, and thereby it is possible to restrict backlash of the rotor shaft 2 with the guide metals 20, 21, and to prevent breakage or the like of a component due to backlash of the rotor shaft 2. In a case where the carrier ring 11 has an integrated structure instead of a structure divided into the upper half section carrier ring 12 and the lower half section carrier ring 13, or has a structure divided into three pieces or more, it is sufficient if the guide metals 20, 21 are disposed in the upper half region of the carrier ring 11.

The upper half section carrier ring 12 and the lower half section carrier ring 13 include at least one oil-supply nozzles 25 to 28.

In the example shown in FIG. 2, in a case where the rotor shaft 2 rotates clockwise as indicated by the arrow S in the drawing, four oil-supply nozzles are disposed from the upstream side with respect to the rotational direction S of the rotor shaft 2, including: the first oil-supply nozzle 24, the second oil-supply nozzle 26, the third oil-supply nozzle 27, and the fourth oil-supply nozzle 28. The first oil-supply nozzle 25 and the second oil-supply nozzle 26 are disposed aligned in the circumferential direction, on the upstream side of the first bearing pad 30 positioned on the upstream side. A gap may be disposed between the second oil-supply nozzle 26 and the upstream end portion of the bearing pad 30. The third oil-supply nozzle 27 is disposed between the first bearing pad 30 and the second bearing pad 30 disposed on the downstream side of the first bearing pad 30. A gap may be disposed between the third oil-supply nozzle 27 and the second bearing pad 32. The fourth oil-supply nozzle 28 is disposed downstream of the second bearing pad 32. A gap may be disposed between the fourth oil-supply nozzle 28 and the second bearing pad 32.

A lubricant oil supply passage (not shown) is disposed through the carrier ring 11. Lubricant oil supplied to the lubricant oil supply passage is sent to each of the oil-supply nozzles 25 to 29, and is injected from each of the oil-supply nozzles 25 to 29 to the vicinity of the bearing pads 30, 32.

The first bearing pad 30 and the second bearing pad 32 are disposed on the radially inner side of the lower half section carrier ring 13, and are configured to support the rotor shaft 2 from below.

The first bearing pad 30 is disposed along the outer periphery of the rotor shaft 2, on the radially inner side of the lower half section carrier ring 13.

The second bearing pad 32 is disposed along the outer periphery of the rotor shaft 2, on the radially inner side of the lower half section carrier ring 13, downstream of the first bearing pad 30 with respect to the rotational direction S of the rotor shaft 2.

Accordingly, the first bearing pad 30 and the second bearing pad 32 are disposed on the lower half section carrier ring 13, and thus it is possible to support the rotor shaft 2 appropriately with the first bearing pad 30 and the second bearing pad 32.

In a case where the carrier ring 11 has an integrated structure instead of a structure divided into the upper half section carrier ring 12 and the lower half section carrier ring 13, or has a structure divided into three pieces or more, it is sufficient if the first bearing pad 30 and the second bearing pad 32 are disposed in the lower half region of the carrier ring 11.

The first bearing pad 30 and the second bearing pad 32 can indicate any two bearing pads disposed adjacent to each other in the circumferential direction, and not particular bearing pads. For instance, in a configuration where three bearing pads are disposed from the upstream side with respect to the rotational direction S, when focusing on the most upstream bearing pad and the intermediate bearing pad, the most upstream bearing pad is the first bearing pad 30, and the intermediate bearing pad is the second bearing pad 32. Alternatively, when focusing on the intermediate bearing pad and the most downstream bearing pad, the intermediate bearing pad is the first bearing pad 30, and the most downstream bearing pad is the second bearing pad 32.

Next, with reference to FIGS. 3 to 12, the configuration including the first oil guide portion 40, 50 and the oil discharge port portion 42, 52 will be described.

In some embodiments, as shown in FIGS. 3, 4, 7, and 8, the first oil-guide portion 40, 50 is disposed on the downstream side of the first bearing pad 30 and the upstream side of the second bearing pad 32, and configured to change the flow direction of oil having passed through the gap between the inner peripheral surface 30a of the first bearing pad 30 and the outer peripheral surface of the rotor shaft 2, and guide the oil.

The oil discharge port portion 42, 52 is disposed on each of the side plates 17, 18 or the carrier ring 11 (lower half section carrier ring 13), and configured to discharge oil that is guided by the first oil guide portion 40, 50.

With this configuration, the first oil-guide portion 40, 50 disposed on the downstream side of the first bearing pad 30 and the upstream side of the second bearing pad 32 changes the flow direction of oil that has passed through the gap between the inner peripheral surface 30a of the first bearing pad 30 and the outer peripheral surface of the rotor shaft 2 and thus has an increased temperature, and guides the oil. Further, the high-temperature oil guided by the first oil guide portion 40, 50 is discharged outside through the oil discharge port portions 42, 52 disposed on the respective side plates 17, 18 or the carrier ring 11. Accordingly, at least a part of oil having an increased temperature from passing through the gap between the first bearing pad 30 and the rotor shaft 2 is discharged outside, without flowing into the gap between the second bearing pad 32 and the rotor shaft 2. Thus, it is possible to suppress a temperature increase of the second bearing pad 32 effectively.

Further, the above described oil-supply nozzle (third oil-supply nozzle) 27 is disposed between the first oil guide portion 40, 50 and the upstream end portion of the second bearing pad 32. The oil-supply nozzle 27 has an oil injection hole 27b which injects oil, and the injected oil is supplied to the gap between the inner peripheral surface 32a of the second bearing pad 32 and the outer peripheral surface of the rotor shaft 2. Thus, the shortage in the oil amount due to discharge of the oil to outside through the first oil guide portion 40, 50 and the oil discharge port portions 42, 52 is covered by the oil freshly supplied from the oil-supply nozzle 27. Thus, it is possible to supply a sufficient amount of oil that can ensure a good lubricating property, to the gap between the inner peripheral surface 32a of the second bearing pad 32 and the outer peripheral surface of the rotor shaft 2.

The bearing device 10 according to an embodiment includes grooves 17b, 18b that extend in the circumferential direction along the side surfaces of the first bearing pad 30 in at least a part of the extending range of the first bearing pad 30, in respective regions of the inner peripheral surfaces of the side plates 17, 18 that are closer to the lower half section carrier ring 13. For instance, the grooves 17b, 18b are formed by recess portions defined by protruding portions 17a, 18a disposed on the inner peripheral surfaces of the respective side plates 17, 18 and the inner peripheral surfaces of the side plates 17, 18 closer to the lower half section carrier ring 13 than the protruding portions 17a, 18a. The protruding portions 17a, 18a extend along the outer periphery of the rotor shaft 2 on both sides, with respect to the rotational direction S of the rotor shaft 2, across the downstream end portion of the first bearing pad 30. As described above, by providing the protruding portions 17a, 18a on the inner peripheral surfaces of the side plates 17, 18 along the outer periphery of the rotor shaft 2, it is possible to form the grooves (recess portions) 17b, 18b with a simple configuration.

The grooves 17b, 18b may extend along the outer periphery of the rotor shaft 2, in a circumferential-directional range including the extending range of the first bearing pad 30 and the second bearing pad 32.

Accordingly, it is possible to guide oil with a relatively low temperature that leaks sideways from the first bearing pad 30 downstream toward the upstream end portion of the second bearing pad 32, via the grooves 17b, 18b disposed on the side plates 17, 18 in the circumferential-directional range including the existing range of the first bearing pad 30 and the second bearing pad 32.

The bottom surfaces of the grooves 17b, 18b (surfaces facing the outer peripheral surface of the rotor shaft 2) are positioned on the inner side of the outer peripheral surface 30b of the first bearing pad 30, with respect to the radial direction of the lower half section carrier ring 13.

With this configuration, the grooves 17b, 18b are disposed on the inner side of the outer peripheral surface 30b of the first bearing pad 30, with respect to the radial direction, and thus it is possible to prevent oil flowing through the grooves 17b, 18b from flowing into the outer peripheral surface 30b of the first bearing pad 30.

Also, the bottom surfaces of the grooves 17b, 18b may be positioned on the inner side of the outer peripheral surface 32b of the second bearing pad 32, with respect to the radial direction of the lower half section carrier ring 13.

Figure 4:
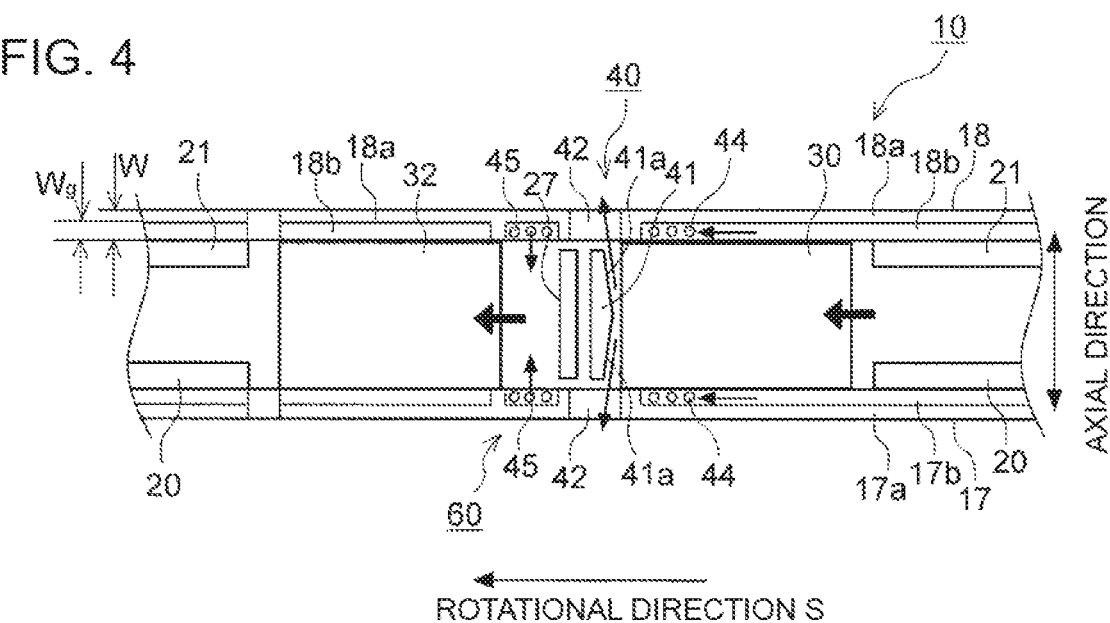
FIG. 4 is an exploded view of the lower half region of the bearing device shown in FIG. 3, as seen in the direction C.
Figure 8:
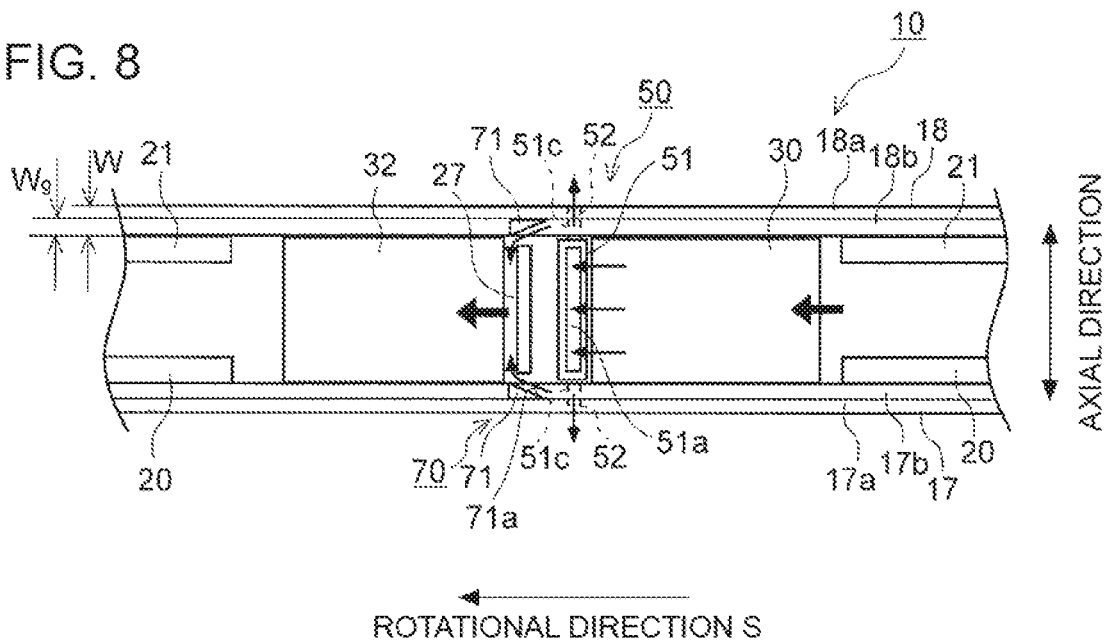
FIG. 8 is an exploded view of the lower half region of the bearing device shown in FIG. 7, as seen in the direction F.

Furthermore, as shown in FIGS. 4 and 8, provided that W is the entire width of each side plate 17, 18 in the axial direction and Wg is the axial-directional width of the grooves 17b, 18b, an expression $0.15W \leq W_g$ may be satisfied.

In this way, it is possible to ensure a sufficient flow-passage cross sectional area for the grooves 17b, 18b, and to effectively guide oil with a relatively low temperature leaking sideways from the gap between the inner peripheral surface 30a of the first bearing pad 30 and the outer peripheral surface of the rotor shaft 2 downstream toward the second oil guide portion 60.

As shown in FIGS. 3 to 12, in some embodiments, the bearing device 10 further includes the second oil guide portion 60, 70.

The second oil guide portion 60, 70 is configured to guide oil having flowed into the grooves 17b, 18b from the gap between the inner peripheral surface 30a of the first bearing pad 30 and the outer peripheral surface of the rotor shaft 2, and return the oil to the gap between the downstream end portion of the first bearing pad 30 and the upstream end portion of the second bearing pad 32.

With the above configuration, oil having a relatively low temperature flowing through the grooves 17b, 18b that extend in the circumferential direction along the side surfaces of the first bearing pad 30 is returned through the second oil guide portion 60, 70 to the gap between the downstream end portion of the first bearing pad 30 and the upstream end portion of the second bearing pad 32. Thus, it is possible to supply the relatively low-temperature oil to the gap between the inner peripheral surface 32a of the second bearing pad 32 and the outer peripheral surface of the rotor shaft 2, and to effectively suppress temperature increase of the second bearing pad 32. Further, it is possible to reduce the amount of oil supplied from outside via the oil-supply nozzle 27, by returning the relatively low-temperature oil through the second oil guide portion 60, 70, instead of the oil discharged outside from the oil discharge port portion 42, 52 after flowing through the gap between the inner peripheral surface 30a of the first bearing pad 30 and the outer peripheral surface of the rotor shaft 2.

Figure 3:
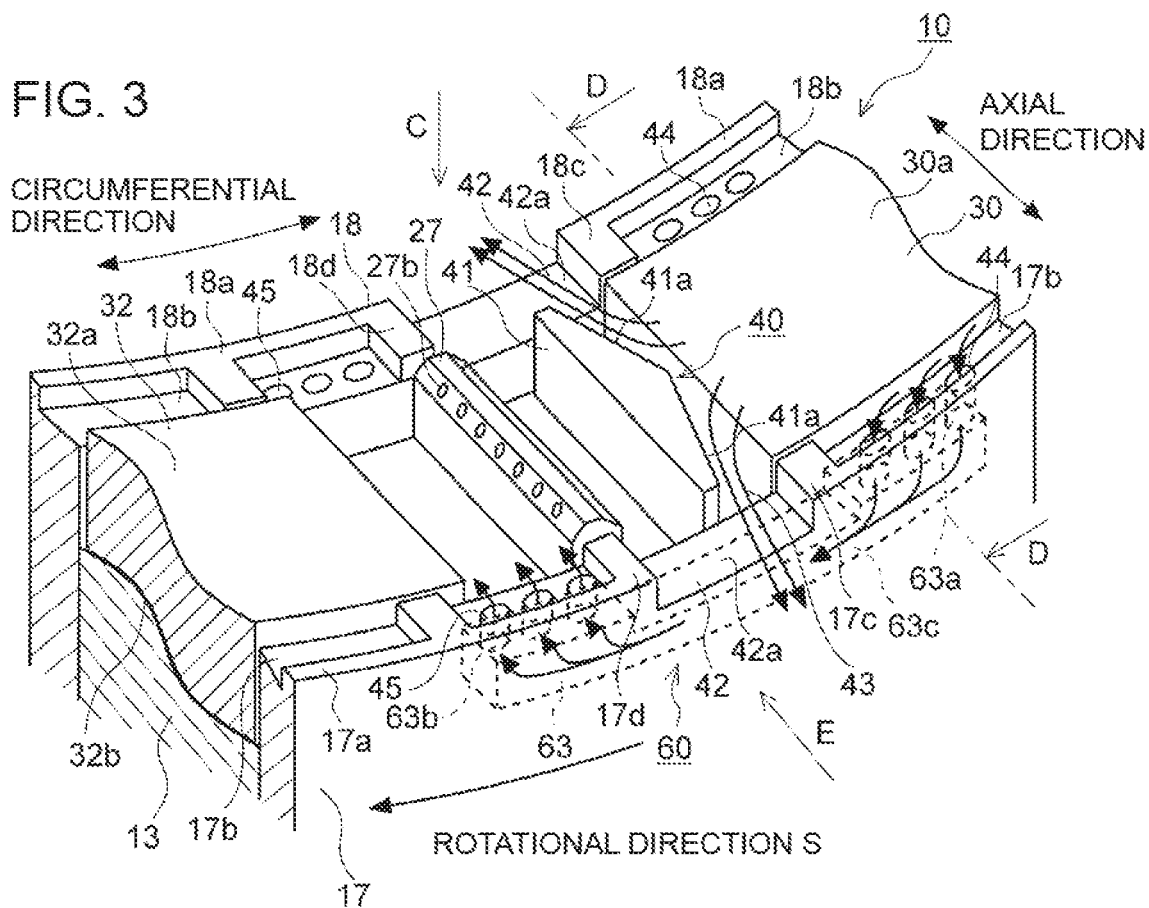
FIG. 3 is a perspective diagram of a lower half region of a bearing device according to an embodiment.
Figure 7:
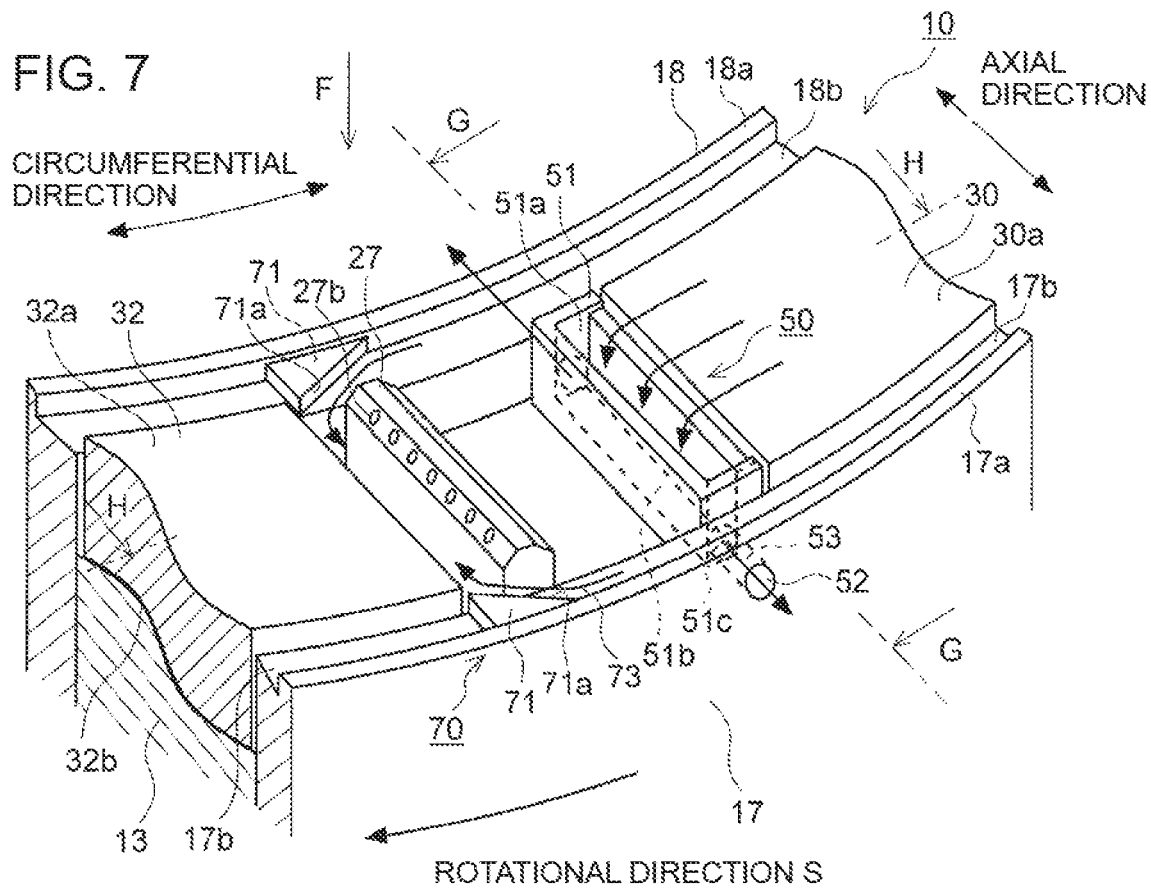
FIG. 7 is a perspective diagram of a lower half region of a bearing device according to another embodiment.

As shown in FIGS. 3 and 7, in an embodiment, the first oil guide portion 40, 50 and the second oil guide portion 60, 70 are formed by two flow passages (the first flow passage 43, 53 and the second flow passage 63, 73) intersecting with each other and passing through different positions in the radial direction of the lower half section carrier ring 13.

The first flow passage 43, 53 is formed by the first oil guide portion 40, 50. The high-temperature oil after passing through the gap between the inner peripheral surface 30a of the first bearing pad 30 and the outer peripheral surface of the rotor shaft 2 passes through the first flow passage 43, 53, and thereby changes it flow direction from the main flow along the rotational direction S of the rotor shaft 2, and is guided to the oil discharge port portion 42, 52. Furthermore, the second flow passage 63, 73 is formed by the second oil guide portion 60, 70. The relatively low-temperature oil (side flow) flowing along the rotational direction S inside the grooves 17b, 18b passes through the second flow passage 63, 73, and thereby returns to the main flow between the first bearing pad 30 and the second bearing pad 32. That is, the first oil guide portion 40, 50 and the second oil guide portion 60, 70 change the oil of the main flow flowing downstream in the rotational direction S of the rotor shaft 2 along the outer peripheral surface of the rotor shaft 2, from the relatively high-temperature oil after passing through the gap between the inner peripheral surface 30a of the first bearing pad 30 and the outer peripheral surface of the rotor shaft 2, to the relatively low-temperature oil flowing through the grooves 17b, 18b formed along the side surfaces of the first bearing pad 30.

Thus, as in the above configuration, with the first oil guide portion 40, 50 and the second oil guide portion 60, 70 being formed by two flow passages (the first flow passage 43, 53 and the second flow passage 63, 73) that intersect with each other, it is possible to change the main flow oil smoothly.

In an embodiment, the gap between the inner peripheral surface of each side plate 17, 18 and the outer peripheral surface of the rotor shaft 2 is narrower in a circumferential-directional region which is at least a part of the extending range of the first bearing pad 30, than in a circumferential-directional range that is upstream of the upstream end portion of the first bearing pad 30 and downstream of the downstream end portion of the second bearing pad 32.

Accordingly, it is possible to suppress leakage of oil from the side plates 17, 18 on both sides of the first bearing pad 30, and ensure an oil amount between the inner peripheral surface 30a of the first bearing pad 30 and the outer peripheral surface of the rotor shaft 2.

Next, the bearing device 10 according to each embodiment will be described in detail.

Figure 5:
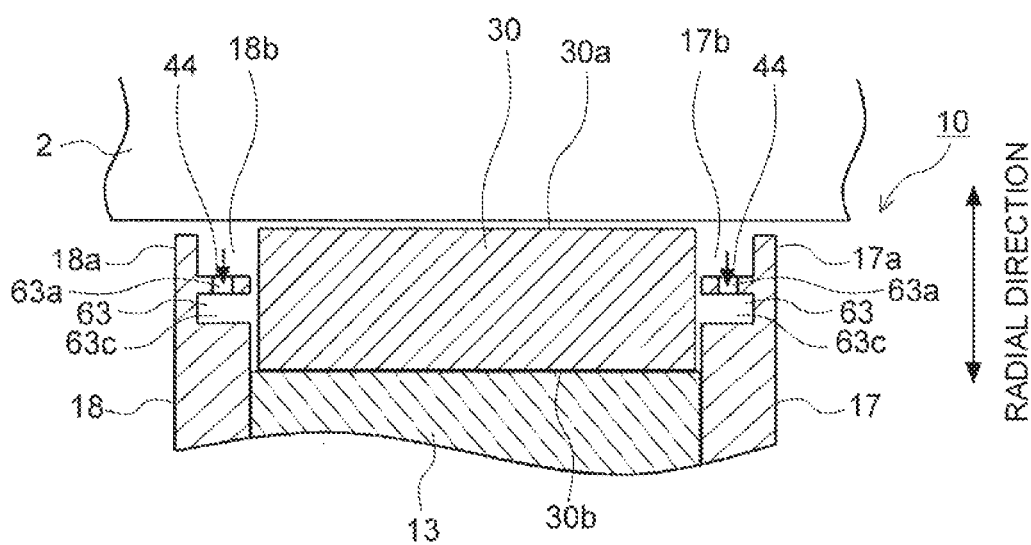
FIG. 5 is a cross-sectional view of the lower half region of the bearing device shown in FIG. 3, taken along line D-D.
Figure 6:
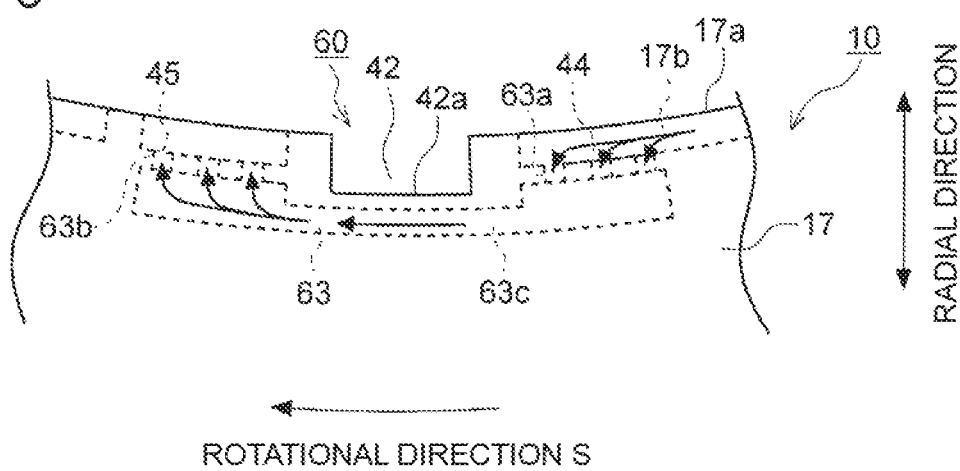
FIG. 6 is an arrow directional view of the lower half region of the bearing device shown in FIG. 3, as seen in the direction E.

FIG. 3 is a perspective diagram of a lower half region of the bearing device 10 according to an embodiment. FIG. 4 is an exploded view of the lower half region of the bearing device 10 shown in FIG. 3, as seen in the direction C. FIG. 5 is a cross-sectional view of the lower half region of the bearing device 10 shown in FIG. 3, taken along line D-D. FIG. 6 is an arrow directional view of the lower half region of the bearing device 10 shown in FIG. 3, as seen in the direction E.

In the bearing device 10 according to an embodiment, the first oil guide portion 40 includes a scraper 41 disposed on the downstream side of the first bearing pad 30.

The scraper 41 is configured to change the flow direction of the main flow of oil flowing between the inner peripheral surface 30a of the first bearing pad 30 and the outer peripheral surface of the rotor shaft 2, and guide the oil to the oil discharge port portion 42. Of the upstream end surface of the scraper 41, the regions on both ends with respect to the axial direction include inclined surfaces 41a, 41a which are inclined from the axial direction so as to be offset toward the downstream side with respect to the rotational direction S of the rotor shaft with distance from the center part of the axial-directional width of the first bearing pad 30, with respect to the axial direction. The scraper 41 may be fastened to the lower half section carrier ring 13 with a bolt (not shown). Furthermore, another scraper 41 may be disposed on the downstream side of the second bearing pad 32. In this case, the other scraper 41 disposed on the downstream side of the second bearing pad 32 has the same configuration as the scraper 41 disposed on the downstream side of the first bearing pad 30 and the upstream side of the second bearing pad 32.

The oil discharge port portion 42 includes an opening portion 42a formed on each side plate 17, 18 on the downstream side of the first bearing pad 30 and the upstream side of the second bearing pad 32. Specifically, the protruding portions 17a, 18a formed on the side plates 17, 18 terminate on the downstream side of the first bearing pad 30 and the upstream side of the second bearing pad 32, and protruding portions 17c, 18c and protruding portions 17d, 18d are disposed so as to protrude inward in the axial direction from the terminating ends of the protruding portions 17a, 18a. The protruding portion 17c and the protruding portion 17d are disposed separated from each other in the circumferential direction, and each wall surface of the protruding portion 17c and the protruding portion 17d and the inner peripheral surface of the side plate 17 form the opening portion 42a. Similarly, the protruding portion 18c and the protruding portion 18d are disposed separated from each other in the circumferential direction, and each wall surface of the protruding portion 18c and the protruding portion 18d and the inner peripheral surface of the side plate 18 form the opening portion 42a.

With the above configuration, the high-temperature oil flowing between the inner peripheral surface 30a of the first bearing pad 30 and the outer peripheral surface of the rotor shaft 2 in the circumferential direction of the rotor shaft 2 has its flow direction changed by the scraper 41, and is guided to both sides with respect to the axial direction along the inclined surfaces 41a, 41a of the scraper 41. Thus, it is possible to avoid inflow of high-temperature oil to the second bearing pad 32, and to suppress temperature increase of the second bearing pad 32 effectively. Furthermore, it is possible to smoothly discharge high-temperature oil that flows between the inner peripheral surface 30a of the first bearing pad 30 and the outer peripheral surface of the rotor shaft 2 in the circumferential direction of the rotor shaft 2, via the opening portion 42a formed on the side plates 17, 18, before the oil flows into the gap between the inner peripheral surface 32a of the second bearing pad 32 and the outer peripheral surface of the rotor shaft 2.

Furthermore, the second oil guide portion 60 includes an inner flow passage (second flow passage 63) disposed inside the side plates 17, 18 so as to bring the oil inlet aperture 44 and the oil outlet aperture 45 each having an opening into the grooves 17b, 18b, into communication. The oil inlet aperture 44 is disposed so as to be positioned by the side of the first bearing pad 30. Specifically, the oil inlet aperture 44 has an opening on the bottom surface of the grooves 17b, 18b (surface facing the rotor), and at least one oil inlet aperture is provided. The oil outlet aperture 45 is disposed on a circumferential-directional position between the downstream end portion of the first bearing pad 30 and the upstream end portion of the second bearing pad 32. Specifically, the oil outlet aperture 45 has an opening on the bottom surface of the grooves 17b, 18b (surface facing the rotor), and at least one oil inlet aperture is provided. Furthermore, in a case where the oil-supply nozzle 27 is disposed in the vicinity, the oil outlet aperture 45 may be disposed downstream of the oil-supply nozzle 27 and upstream of the second bearing pad 32, with respect to the rotational direction S. In the example shown in the drawing, the second flow passage 63 includes a plurality of first radial-directional flow passages 63a extending radially outward from respective oil inlet apertures 44, a plurality of second radial-directional flow passages 63b extending radially outward from the respective oil outlet apertures 45, and a single circumferential-directional flow passage 63c extending in the circumferential direction and being in communication with the plurality of first radial-directional flow passages 63a and the plurality of second radial-directional flow passages 63b.

With this configuration, it is possible to guide the oil flowing through the grooves 17b, 18b from the side of the first bearing pad 30 to the upstream end portion of the second bearing pad 32 through the second oil guide portion 60, via the inner flow passage (second flow passage 63) of the side plates 17, 18, without impairing the flow of the relatively high-temperature oil guided by the first oil guide portion 40 and discharged from the oil discharge port portion 42.

Figure 9:
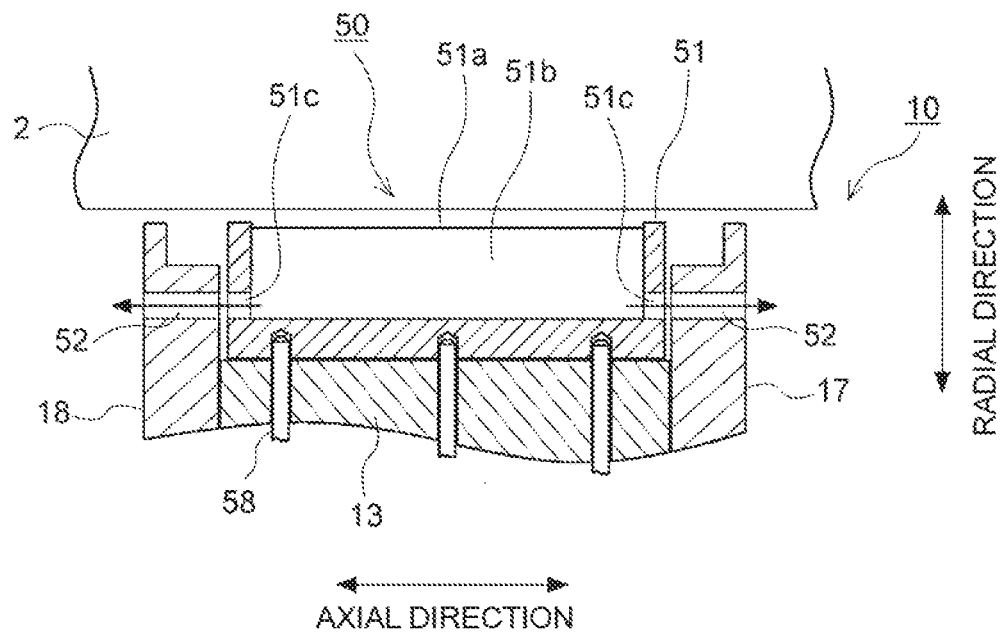
FIG. 9 is a cross-sectional view of the lower half region of the bearing device shown in FIG. 7, taken along line G-G.
Figure 10:
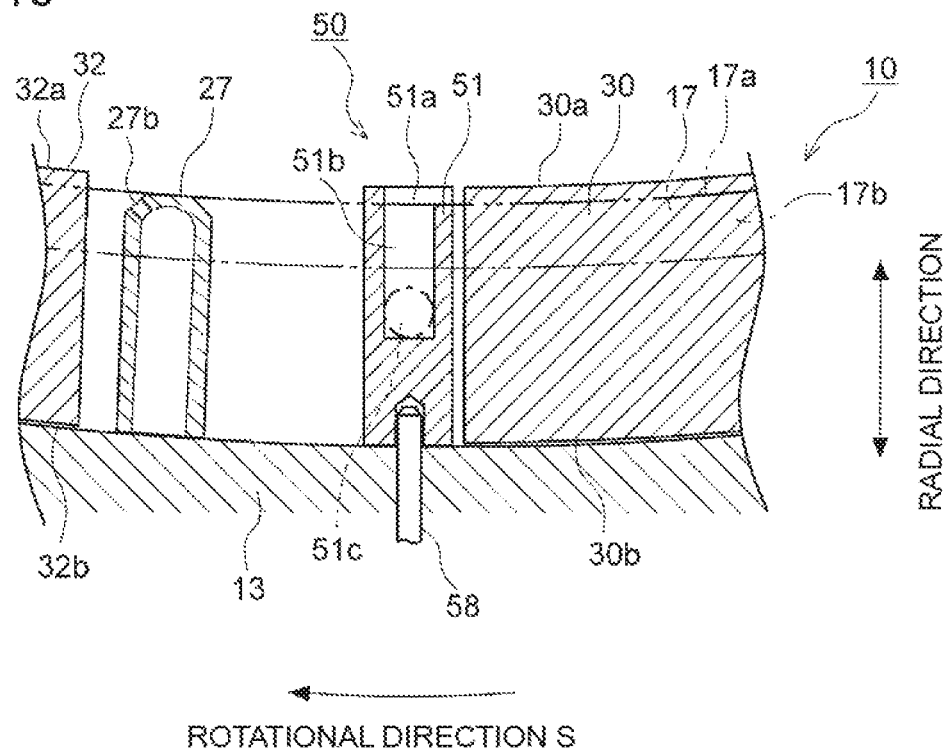
FIG. 10 is a cross-sectional view of the lower half region of the bearing device shown in FIG. 7, taken along line H-H.
Figure 11:
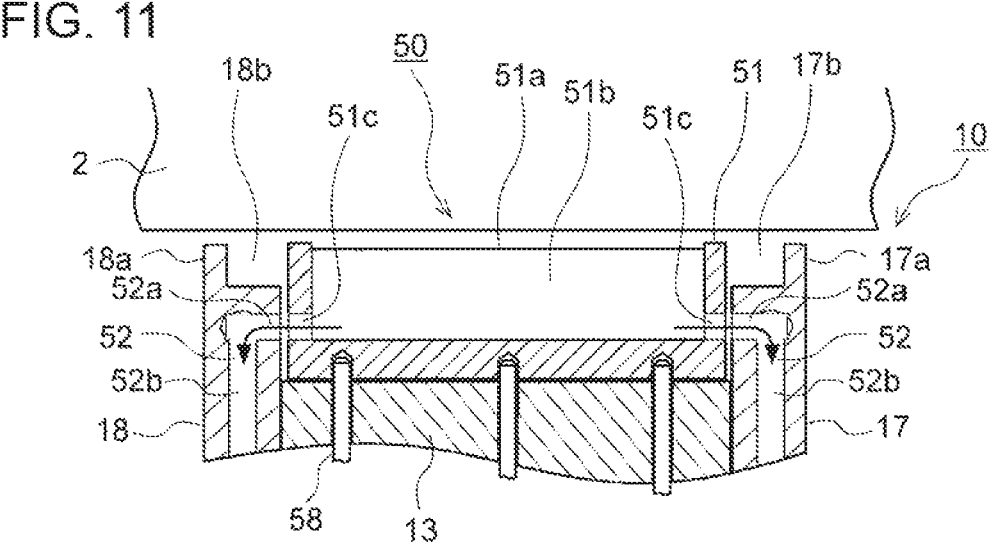
FIG. 11 is a cross-sectional view of a modified example of the bearing device shown in FIG. 7 (corresponding to the line G-G cross section in FIG. 7).
Figure 12:
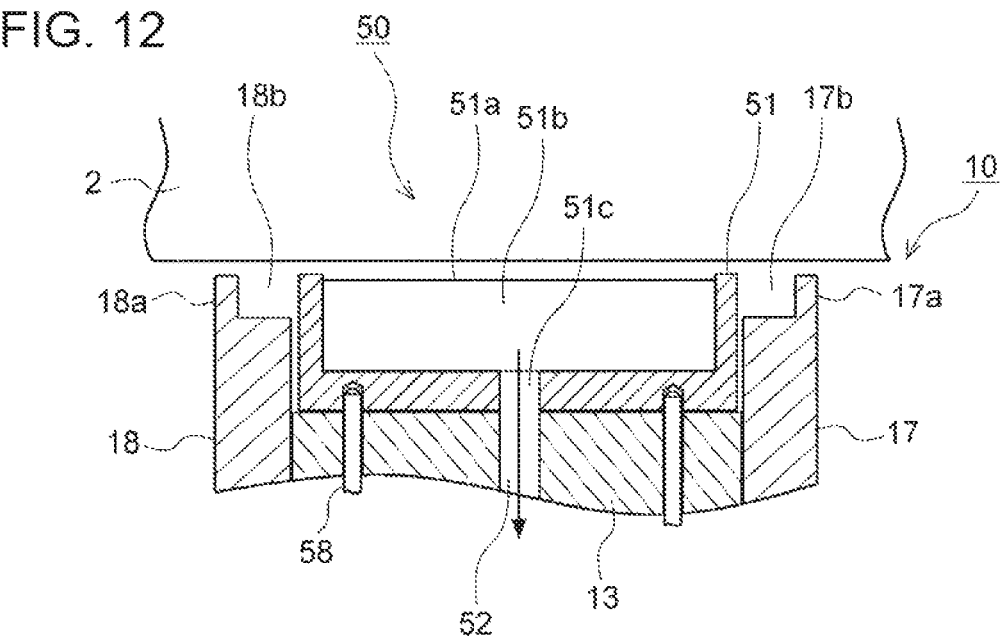
FIG. 12 is a cross-sectional view of another modified example of the bearing device shown in FIG. 7 (corresponding to the line G-G cross section in FIG. 7).

FIG. 7 is a perspective diagram of a lower half region of the bearing device 10 according to another embodiment. FIG. 8 is an exploded view of the lower half region of the bearing device 10 shown in FIG. 7, as seen in the direction F. FIG. 9 is a cross-sectional view of the lower half region of the bearing device 10 shown in FIG. 7, taken along line G-G. FIG. 10 is a cross-sectional view of the lower half region of the bearing device 10 shown in FIG. 7, taken along line H-H. FIG. 11 is a cross-sectional view of a modified example of the bearing device 10 shown in FIG. 7 (corresponding to the line G-G cross section of FIG. 7). FIG. 12 is a cross-sectional view of another modified example of the bearing device 10 shown in FIG. 7 (corresponding to the line G-G cross section of FIG. 7).

In the bearing device 10 according to an embodiment, the first oil guide portion 50 includes an oil recovery box 51 disposed on the downstream side of the first bearing pad 30.

The oil recovery box 51 includes an oil inlet portion 51a disposed on the upper surface of the oil recovery box 51, an inner flow passage portion 51b disposed inside the oil recovery box 51, and an oil outlet portion 51c disposed on the side surface or the bottom surface of the oil recovery box 51. The oil recovery box 51 may be fastened to the lower half section carrier ring 13 with a bolt 58.

The oil inlet portion 51a has an opening into the gap between the inner peripheral surface 30a of the first bearing pad 30 and the outer peripheral surface of the rotor shaft 2. Further, the high-temperature oil flowing between the inner peripheral surface 30a of the first bearing pad 30 and the outer peripheral surface of the rotor shaft 2 flows into the oil recovery box 51 from the oil inlet portion 51a.

The inner flow passage portion 51b is in communication with the oil inlet portion 51a, and is disposed so as to extend in the axial direction inside the oil recovery box 51. In the illustrated example, the inner flow passage portion 51b extends outward in the radial direction from the oil inlet portion 51a, and extends in the axial direction inside the oil recovery box 51. The high-temperature oil from the oil inlet portion 51a flows through the inner flow passage portion 51b.

The oil outlet portion 51c is configured to bring the inner flow passage portion 51b and the oil discharge port portion 52 into communication. The high-temperature oil flowing through the inner flow passage portion 51b is discharged outside from the oil discharge port portion 52b via the oil outlet portion 51c.

In another embodiment shown in FIGS. 7 to 10, the oil outlet portion 51c is formed to penetrate through the side surface of the oil recovery box 51 in the axial direction. Furthermore, on the side plates 17, 18, corresponding to the oil outlet portion 51c, an oil discharge port portion 52b is formed to penetrate through the side plates 17, 18 in the axial direction. That is, all of the flow passages from the inner flow passage portion 51b to the oil discharge port portion 52 via the oil outlet portion 51c extend in the axial direction. In this configuration, the high-temperature oil flowing between the inner peripheral surface 30a of the first bearing pad 30 and the outer peripheral surface of the rotor shaft 2 is introduced into the inner flow passage portion 51b from the oil inlet portion 51a, and from the inner flow passage portion 51b, discharged outside through the oil outlet portion 51c and from the oil discharge port portion 52.

In the modified example shown in FIG. 11, the oil outlet portion 51c is formed to penetrate through the side surface of the oil recovery box 51 in the axial direction. Furthermore, on the side plates 17, 18, corresponding to the oil outlet portion 51c, an oil discharge port portion 52b is formed. The oil discharge port portion 52 includes an axial-directional oil discharge flow passage 52a formed to extend in the axial direction from the surfaces of the side plates 17, 18 facing the oil recovery box 51, and a radial-directional oil discharge flow passage 52b extending radially outward from the end portion of the axial directional oil discharge flow passage 52a. In this configuration, the high-temperature oil flowing between the inner peripheral surface 30a of the first bearing pad 30 and the outer peripheral surface of the rotor shaft 2 is introduced into the inner flow passage portion 51b from the oil inlet portion 51a, flows from the inner flow passage portion 51b to the axial-directional oil discharge flow passage 52a via the oil outlet portion 51c, and is discharged outside through the radial-directional oil discharge flow passage 52b in the radial direction.

In the modified example shown in FIG. 12, the oil outlet portion 51c is formed to penetrate through the bottom surface of the oil recovery box 51 in the radial direction. Furthermore, on the lower half section carrier ring 13, corresponding to the oil outlet portion 51c, the oil discharge port portion 52 is formed. The oil discharge port portion 52 includes an aperture portion extending along the radial direction, in at least a partial region connected to the oil outlet portion 51c. In this configuration, the high-temperature oil flowing between the inner peripheral surface 30a of the first bearing pad 30 and the outer peripheral surface of the rotor shaft 2 is introduced into the inner flow passage portion 51b from the oil inlet portion 51a, and from the inner flow passage portion 51b, flows outward in the radial direction to be discharged outside through the oil outlet portion 51c and the oil discharge port portion 52 on the bottom surface.

With this configuration, the high-temperature oil flowing between the inner peripheral surface 30a of the first bearing pad 30 and the outer peripheral surface of the rotor shaft 2 in the circumferential direction of the rotor shaft 2 is introduced into the oil recovery box 51 from the oil inlet portion 51a, passes through the inner flow passage portion 51b, and is discharged from the oil discharge port portion 52 via the oil outlet portion 51c disposed on the side surface or the bottom surface of the oil recovery box 51. Thus, it is possible to avoid inflow of high-temperature oil to the second bearing pad 32, and to suppress temperature increase of the second bearing pad 32 effectively.

Returning to FIGS. 7 to 10, in some embodiments, the second oil guide portion 70 includes a flow guide wall 71 disposed on each of the side plates 17, 18 so as to protrude toward the lower half section carrier ring 13 in the grooves 17b, 18b.

The flow guide wall 71 has an inclined surface 71a inclined from a direction orthogonal to the axial direction of the rotor shaft 2 so as to become closer to the lower half section carrier ring 13 toward the downstream side with respect to the rotational direction S of the rotor shaft 2. In the illustrated example, the flow guide wall 71 has a triangular shape including an inclined surface 71 as a side, in a plan view (view in the F direction of FIG. 7). Alternatively, although not shown, the flow guide wall 71 may have a rectangular shape including the inclined surface 71a. Furthermore, in the illustrated example, the inclined surface 71a has a planar shape. Alternatively, although not shown, the inclined surface 71a may have a curved surface shape protruding downstream in the rotational direction S in a plan view.

With the above configuration, the second oil guide portion 70 includes the flow guide wall 71 disposed on each of the side plates 17, 18 so as to protrude toward the lower half section carrier ring 13 in the grooves 17b, 18b, and thus it is possible to change the flow direction of oil flowing through the grooves 17b, 18b toward the center side with respect to the width direction of the second bearing pad 32, with the flow guide wall 71. Furthermore, the flow guide wall 71 has an inclined surface 71a inclined from a direction orthogonal to the axial direction of the rotor shaft 2 so as to become closer to the lower half section carrier ring 13 toward the downstream side of the rotational direction S of the rotor shaft 2, and thus it is possible to change the flow direction smoothly without impairing the flow of oil inside the grooves 17b, 18b.

As described above, according to the embodiment of the present invention, oil having an increased temperature from passing through the gap between the inner peripheral surface 30a of the first bearing pad 30 and the outer peripheral surface of the rotor shaft 2 is discharged outside, and thus it is possible to effectively suppress temperature increase of the second bearing pad 32.

Embodiments of the present invention were described in detail above, but the present invention is not limited thereto, and various amendments and modifications may be implemented.

For instance, while the first oil guide portion 40 including the scraper 41 is provided in the embodiment shown in FIGS. 3 to 6, instead of the first oil guide portion 40, a first oil guide portion 50 including the oil recovery box 51 in another embodiment shown in FIGS. 7 to 12 may be provided. Furthermore, while the second oil guide portion 60 including the inner flow passage inside the side plates 17, 18 is provided in the embodiment shown in FIGS. 3 to 6, instead of the second oil guide portion 60, a second oil guide portion 70 including the flow guide wall 71 in another embodiment shown in FIGS. 7 to 12 may be provided. As described above, a component of an embodiment shown in FIGS. 3 to 6 and a component of another embodiment shown in FIGS. 7 to 12 can be combined flexibly.

Figure 13:
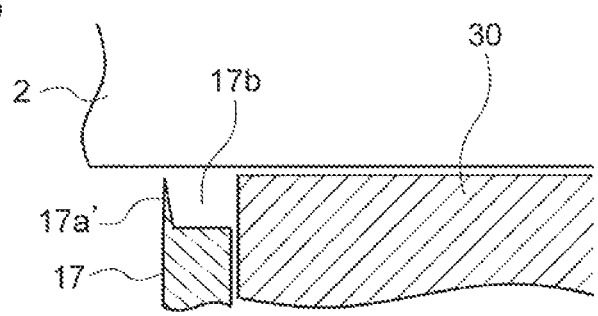
FIG. 13 is a cross-sectional view showing a configuration example of a side plate according to another embodiment.

Furthermore, while the grooves 17b, 18b are formed by the protruding portions 17a, 18a disposed on the side plates 17, 18 in the embodiment shown in FIGS. 3 to 12, as shown in FIG. 13, the groove 17b may be formed by a fin 17a' disposed on the side plate 17. Herein, FIG. 13 is a cross-sectional view along the axial direction of the side plate 17 in another embodiment. With reference to FIGS. 3, 7, and 13 described above, the fin 17a' is disposed on the inner peripheral surface of the side plate 17, and extends along the outer periphery of the rotor shaft 2 on both sides, with respect to the rotational direction of the rotor shaft 2, across the downstream end portion of the first bearing pad 30. Further, the groove 17b is formed by a recess portion defined by the fin 17a' and the inner peripheral surface of the side plate 17 that is closer to the lower half section carrier ring 13 than the fin 17a'. While the side plate 18 is not shown in the drawing, also on the side plate 18, the groove 18b is formed by a fin. With this configuration, by providing the fin 17a' on the inner peripheral surfaces of the side plates 17, 18 along the outer periphery of the rotor shaft 2, it is possible to form the grooves (recess portions) with a simple configuration. Furthermore, since a portion other than the fin 17a', of the outer peripheral surface of each side plate 17, 18, functions as the grooves 17b, 18b, is possible to ensure a sufficient flow-passage cross sectional area for the grooves 17b, 18b to guide relatively-low temperature oil leaking sideways from the gap between the inner peripheral surface 30a of the first bearing pad 30 and the outer peripheral surface of the rotor shaft 2.

Furthermore, while the first oil guide portion 40, 50 and the oil discharge port portion 42, 52 are disposed between the first bearing pad 30 and the second bearing pad 32 in the embodiment shown in FIGS. 3 to 12, the first oil guide portion 40, 50 and the oil guide portion 42, 52 may be disposed between any two adjacent bearing portions (20, 21, 30, 32).

Figure 14:
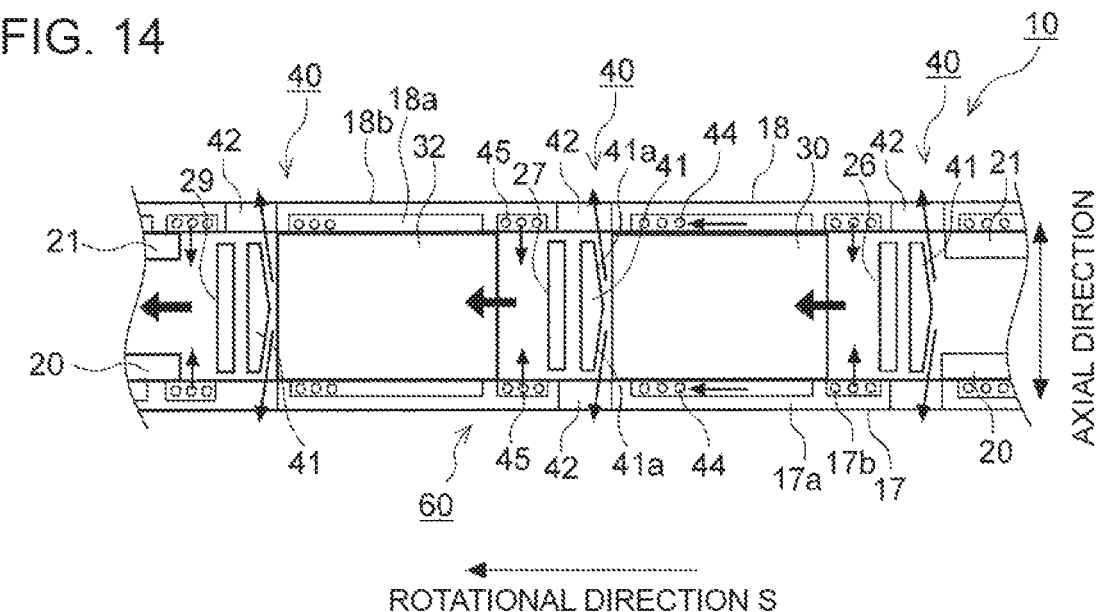
FIG. 14 is a cross-sectional view partially showing the lower half region of a bearing device according to another embodiment (corresponding to G-G in FIG. 7).
Figure 15:
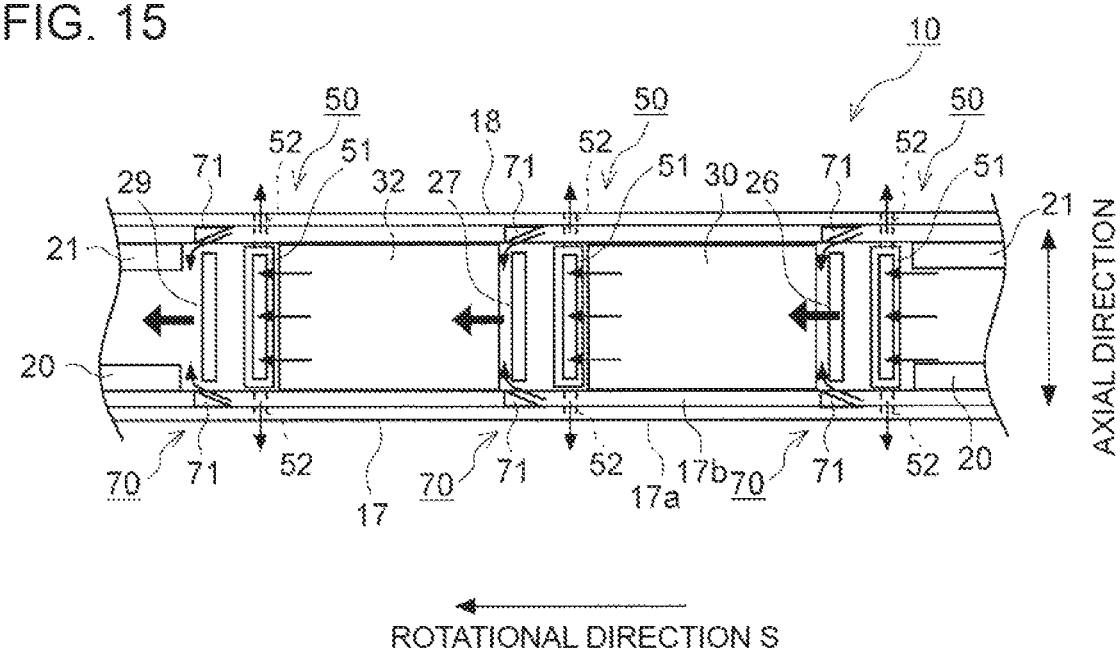
FIG. 15 is a cross-sectional view partially showing the lower half region of a bearing device according to yet another embodiment (corresponding to G-G in FIG. 7).

For instance, as shown in FIGS. 14 and 15, from among the plurality of bearing portions including semi-circular bearing portions (guide metals 20, 21) and the bearing pads (30, 32), the first oil guide portion 40, 50 and the oil discharge port portion 42, 52 may be disposed between two bearing portions being adjacent in the circumferential direction. In an illustrative embodiment shown in FIG. 14, the first oil guide portion 40 and the oil discharge port portion 42 are disposed between the semi-circular bearing portions (guide metals 20, 21) and the first bearing pad 30, between the first bearing pad 30 and the second bearing pad 32, and between the second bearing pad 32 and the semi-circular bearing portion (guide metals 20, 21). Furthermore, in an illustrative embodiment shown in FIG. 14, the first oil guide portion 50 and the oil discharge port portion 52 are disposed between the semi-circular bearing portions (guide metals 20, 21) and the first bearing pad 30, between the first bearing pad 30 and the second bearing pad 32, and between the second bearing pad 32 and the semi-circular bearing portion (guide metals 20, 21).

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

The invention claimed is:

1. A bearing device, comprising:
a carrier ring;
a first bearing portion disposed along an outer periphery of a rotor shaft on a radially inner side of the carrier ring;
a second bearing portion disposed along the outer periphery of the rotor shaft and downstream of the first bearing portion, with respect to a rotational direction of the rotor shaft, on the radially inner side of the carrier ring;
a pair of side plates disposed along the outer periphery of the rotor shaft, one of the pair of side plates being positioned on each side of the carrier ring with respect to an axial direction;
a first oil guide portion disposed downstream of the first bearing portion and upstream of the second bearing portion, and configured to change a flow direction of oil after passing through a gap between an inner peripheral surface of the first bearing portion and an outer peripheral surface of the rotor shaft to guide the oil; and
an oil discharge port portion disposed on the carrier ring or each of the side plates and configured to discharge the oil guided by the first oil guide portion to outside,
wherein, in a carrier-ring side region of an inner peripheral surface of each of the side plates, a groove extending in a circumferential direction along a side surface of the first bearing portion is formed at least in a part of an extending range of the first bearing portion, and
wherein the bearing device further includes a second oil guide portion configured to guide the oil after flowing into the groove from the gap between the inner peripheral surface of the first bearing portion and the outer peripheral surface of the rotor shaft, and return the oil to a gap between a downstream end portion of the first bearing portion and an upstream end portion of the second bearing portion.

2. The bearing device according to claim 1,
wherein the first oil guide portion includes a scraper disposed downstream of the first bearing portion, and
wherein, along an upstream end surface of the scraper, both end regions with respect to the axial direction are inclined from the axial direction so as to be offset downstream in the rotational direction of the rotor shaft with increasing axial distance from a center part of a width of the first bearing portion with respect to the axial direction.

3. The bearing device according to claim 1,
wherein the first oil guide portion includes an oil recovery box disposed downstream of the first bearing portion, and
wherein the oil recovery box includes:
an oil inlet portion disposed on an upper surface of the oil recovery box, the oil inlet portion having an opening facing the gap between the inner peripheral surface of the first bearing portion and the outer peripheral surface of the rotor shaft;
an inner flow passage portion disposed so as to extend in the axial direction inside the oil recovery box, the inner flow passage portion being in communication with the oil inlet portion; and
an oil outlet portion disposed on a side surface or a bottom surface of the oil recovery box, for bringing the inner flow passage portion and the oil discharge port portion into communication.

4. The bearing device according to claim 1,
wherein the oil discharge port portion includes an opening portion formed on each of the side plates and disposed downstream of the first bearing portion and upstream of the second bearing portion.

5. The bearing device according to claim 1,
wherein the oil discharge port portion includes an aperture portion disposed on the carrier ring, downstream of the first bearing portion and upstream of the second bearing portion.

6. The bearing device according to claim 1, wherein the first oil guide portion and the second oil guide portion are formed by two flow passages passing through different positions in a radial direction of the carrier ring and overlapping each other.

7. The bearing device according to claim 1,
wherein the second oil guide portion includes a flow guide wall disposed on each of the side plates so as to protrude toward the carrier ring, inside the groove, and
wherein the flow guide wall is inclined from a direction orthogonal to the axial direction of the rotor shaft, so as to become closer to the carrier ring toward the downstream side with respect to the rotational direction of the rotor shaft.

8. The bearing device according to claim 1,
wherein the second oil guide portion includes an inner flow passage disposed inside the side plates so as to bring into communication an oil inlet aperture and an oil outlet aperture each of which has an opening into the groove,
wherein the oil inlet aperture is disposed so as to be positioned by the side of the first bearing portion, and
wherein the oil outlet aperture is disposed on a circumferential-directional position between the downstream end portion of the first bearing portion and the upstream end portion of the second bearing portion.

9. The bearing device according to claim 7,
wherein the groove inside which the flow guide wall is disposed extends along the outer periphery of the rotor shaft, in a circumferential-directional range including a combined extending range of the first bearing portion and the second bearing portion.

10. The bearing device according to claim 1,
wherein, provided that W is an entire width of each of the side plates in the axial direction and Wg is an axial directional width of the groove, an expression $0.15W \leq Wg$ is satisfied.

11. The bearing device according to claim 1, further comprising a fin which is disposed on an inner peripheral surface of each of the side plates and which extends in the rotational direction of the rotor shaft across the downstream end portion of the first bearing portion,
wherein the groove is formed by a recess portion defined by the fin and the inner peripheral surface of each of the side plates which is closer to the carrier ring than the fin.

12. The bearing device according to claim 1,
wherein a bottom surface of the groove is positioned on an inner side of an outer peripheral surface of the first bearing portion, with respect to a radial direction of the carrier ring.

13. The bearing device according to claim 1, further comprising a semi-circular bearing portion disposed on a radially inner side of an upper half region of the carrier ring and configured to restrain backlash of the rotor shaft from above,
wherein the first bearing portion and the second bearing portion are a pair of respective bearing pads disposed on a radially inner side of a lower half region of the carrier ring and configured to support the rotor shaft from below.

14. A rotary machine, comprising:
the bearing device according to claim 1; and
a rotational shaft supported by the bearing device.

15. A bearing device, comprising: a carrier ring;
a first bearing portion disposed along an outer periphery of a rotor shaft on a radially inner side of the carrier ring;
a second bearing portion disposed along the outer periphery of the rotor shaft and downstream of the first bearing portion, with respect to a rotational direction of the rotor shaft, on the radially inner side of the carrier ring;
a pair of side plates disposed along the outer periphery of the rotor shaft, one of the pair of side plates being positioned on each side of the carrier ring with respect to an axial direction;
a first oil guide portion disposed downstream of the first bearing portion and upstream of the second bearing portion, and configured to change a flow direction of oil after passing through a gap between an inner peripheral surface of the first bearing portion and an outer peripheral surface of the rotor shaft to guide the oil;
an oil discharge port portion disposed on each of the side plates and configured to discharge the oil guided by the first oil guide portion to outside;
an oil supply nozzle disposed downstream of the first oil guide portion and upstream of the second bearing portion, for supplying oil to a gap between an inner peripheral surface of the second bearing portion and the outer peripheral surface of the rotor shaft,
wherein the first oil guide portion includes a scraper disposed downstream of the first bearing portion, and
wherein, along an upstream end surface of the scraper, both end regions with respect to the axial direction are inclined from the axial direction so as to be offset downstream in the rotational direction of the rotor shaft with increasing axial distance from a center part of a width of the first bearing portion with respect to the axial direction,
wherein the oil discharge port portion includes an opening portion disposed on an inner periphery of each of the side plates, and
wherein the oil-supply nozzle extends along the axial direction so as to divide a space between the first bearing portion and the second bearing portion into an upstream space including the scraper and being in communication with the opening portion, and a downstream space surrounded by the second bearing portion, the oil supply nozzle, and a protruding portion protruding radially inward and being disposed downstream of the opening portion on each of the side plates.

16. A bearing device, comprising:

a carrier ring;

a first bearing portion disposed along an outer periphery of a rotor shaft on a radially inner side of the carrier ring;

a second bearing portion disposed along the outer periphery of the rotor shaft and downstream of the first bearing portion, with respect to a rotational direction of the rotor shaft, on the radially inner side of the carrier ring;

a pair of side plates disposed along the outer periphery of the rotor shaft, one of the pair of side plates being positioned on each side of the carrier ring with respect to an axial direction;

a first oil guide portion disposed downstream of the first bearing portion and upstream of the second bearing portion, and configured to change a flow direction of oil after passing through a gap between an inner peripheral surface of the first bearing portion and an outer peripheral surface of the rotor shaft to guide the oil; and an oil discharge port portion disposed on the carrier ring or each of the side plates and configured to discharge the oil guided by the first oil guide portion to outside, wherein the first oil guide portion includes an oil recovery box disposed downstream of the first bearing portion, and wherein the oil recovery box includes:

an oil inlet portion disposed on an upper surface of the oil recovery box, the oil inlet portion having an opening facing the gap between the inner peripheral surface of the first bearing portion and the outer peripheral surface of the rotor shaft;

an inner flow passage portion disposed so as to extend in the axial direction inside the oil recovery box, the inner flow passage portion being in communication with the oil inlet portion; and an oil outlet portion disposed on a side surface or a bottom surface of the oil recovery box, for bringing the inner flow passage portion and the oil discharge port portion into communication, and wherein the oil recovery box includes a pair of side wall portions disposed so as to face each other across the inner flow passage portion in the circumferential direction, and wherein the pair of side wall portions include a first side wall portion disposed on an upstream side and a second side wall portion disposed on a downstream side with respect to the rotational direction, and a height the first side wall portion is lower than a height of the second side wall portion.

* * * * *